United States Patent
Bar-Lev et al.

(10) Patent No.: US 9,158,330 B1
(45) Date of Patent: Oct. 13, 2015

(54) APPARATUS AND METHOD TO COMPENSATE FOR DATA SKEW FOR MULTIPLE MEMORY DEVICES AND ADJUST DELAY FOR INDIVIDUAL DATA LINES BASED ON AN OPTIMIZED CRITICAL WINDOW

(71) Applicant: Marvell Israel (M.I.S.L.) Ltd., Yokneam (IL)

(72) Inventors: Eldad Bar-Lev, Kiryat Tivon (IL); Aaron Landau, Zichron-Yakov (IL)

(73) Assignee: Marvell Israel (M.I.S.L) LTD., Yokneam (IL)

( * ) Notice: Subject to any disclaimer, the term of this patent is extended or adjusted under 35 U.S.C. 154(b) by 385 days.

(21) Appl. No.: 13/677,879

(22) Filed: Nov. 15, 2012

Related U.S. Application Data

(60) Provisional application No. 61/560,200, filed on Nov. 15, 2011, provisional application No. 61/603,030, filed on Feb. 24, 2012.

(51) Int. Cl.
| | | |
|---|---|---|
| *G06F 1/04* | (2006.01) | |
| *G06F 1/24* | (2006.01) | |
| *G06F 11/00* | (2006.01) | |
| *G06F 1/10* | (2006.01) | |
| *G06F 1/12* | (2006.01) | |
| *G06F 1/08* | (2006.01) | |

(52) U.S. Cl.
CPC ........ *G06F 1/105* (2013.01); *G06F 1/10* (2013.01); *G06F 1/12* (2013.01); *G06F 1/08* (2013.01)

(58) Field of Classification Search
CPC .............. G06F 1/10; G06F 1/12; G06F 1/08
See application file for complete search history.

(56) References Cited

U.S. PATENT DOCUMENTS

| | | | | |
|---|---|---|---|---|
| 8,081,527 | B1* | 12/2011 | Venkataraman et al. | 365/194 |
| 2006/0253721 | A1* | 11/2006 | Johnson | 713/401 |
| 2009/0063890 | A1* | 3/2009 | Ware | 713/601 |
| 2010/0315891 | A1* | 12/2010 | Welker | 365/193 |
| 2011/0317495 | A1* | 12/2011 | Ishikawa | 365/189.03 |

* cited by examiner

*Primary Examiner* — Jaweed A Abbaszadeh
*Assistant Examiner* — Gayathri Sampath

(57) ABSTRACT

Methods and apparatuses for processing systems capable of compensating for data skew are disclosed. An example apparatus can include delay circuitry that includes a plurality of delay devices each being individually adjustable to produce an individual delay for each data line with each data line including branches of different lengths leading to different memory devices, and memory control circuitry coupled to the delay circuitry and configured to determine, for each data line, an individual delay based on an optimized critical window, the optimized critical window being based on multiple chip select signals.

18 Claims, 4 Drawing Sheets

APPARATUS AND METHOD TO COMPENSATE FOR DATA SKEW FOR MULTIPLE MEMORY DEVICES AND ADJUST DELAY FOR INDIVIDUAL DATA LINES BASED ON AN OPTIMIZED CRITICAL WINDOW

INCORPORATION BY REFERENCE

This application claims the benefit of U.S. Provisional Application No. 61/560,200 entitled "Per-Bit-Deskew for Multiple Ranks" filed on Nov. 15, 2011, the content of which is incorporated herein by reference in its entirety. This application also claims the benefit of U.S. Provisional Application No. 61/603,030 also entitled "Per-Bit-Deskew for Multiple Ranks" filed on Feb. 24, 2012, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

As computers and computer memories operate ever faster, memory performance becomes increasingly subject to timing skew. For example, memory setup and hold times, which were measured in the tens of nanoseconds a decade ago, are now measured in picoseconds. As a result, the variation in delays between different memory chips to a processor caused by different signal path lengths, as well as the delays between individual bits on the same memory chip, can lead to performance problems.

SUMMARY

Various aspects and embodiments of the invention are described in further detail below.

In an embodiment, an apparatus embedded in a processing system is configured to compensate for data skew for multiple memory devices with each memory device including a plurality of data lines of varying lengths respectively coupled to the data lines of at least one other memory device. The apparatus comprises delay circuitry that includes a plurality of delay devices each being individually adjustable to produce an individual delay for each data line with each data line including branches of different lengths leading to different memory devices, and memory control circuitry coupled to the delay circuitry and configured to determine, for each data line, an individual delay based on an optimized critical window, the optimized critical window being based on multiple chip select signals.

In another embodiment, an apparatus embedded in a processing system configured to compensate for data skew for multiple memory devices with each memory device including a plurality of data lines of varying lengths respectively coupled to the data lines of at least one other memory device, is disclosed. The apparatus includes one or more integrated circuits. The integrated circuits include delay circuitry that includes a plurality of delay devices each being individually adjustable to produce an individual delay for each data line with each data line including branches of different lengths leading to different memory devices, and memory control circuitry coupled to the delay circuitry and configured to determine, for each data line, an individual delay based on an optimized critical window, the optimized critical window being based on multiple chip select signals.

In yet another embodiment, a method for compensating for data skew among multiple memory devices with each memory device including a plurality of data lines of varying lengths respectively coupled to the data lines of at least one other memory device is disclosed. The method includes determining, for each data line having portions of different lengths, an individual delay based on an optimized critical window, the optimized critical window being based on multiple chip select signals, and adjusting a delay for each of a plurality of delay devices to produce an individual delay for each data line.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below are described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Figure 1:
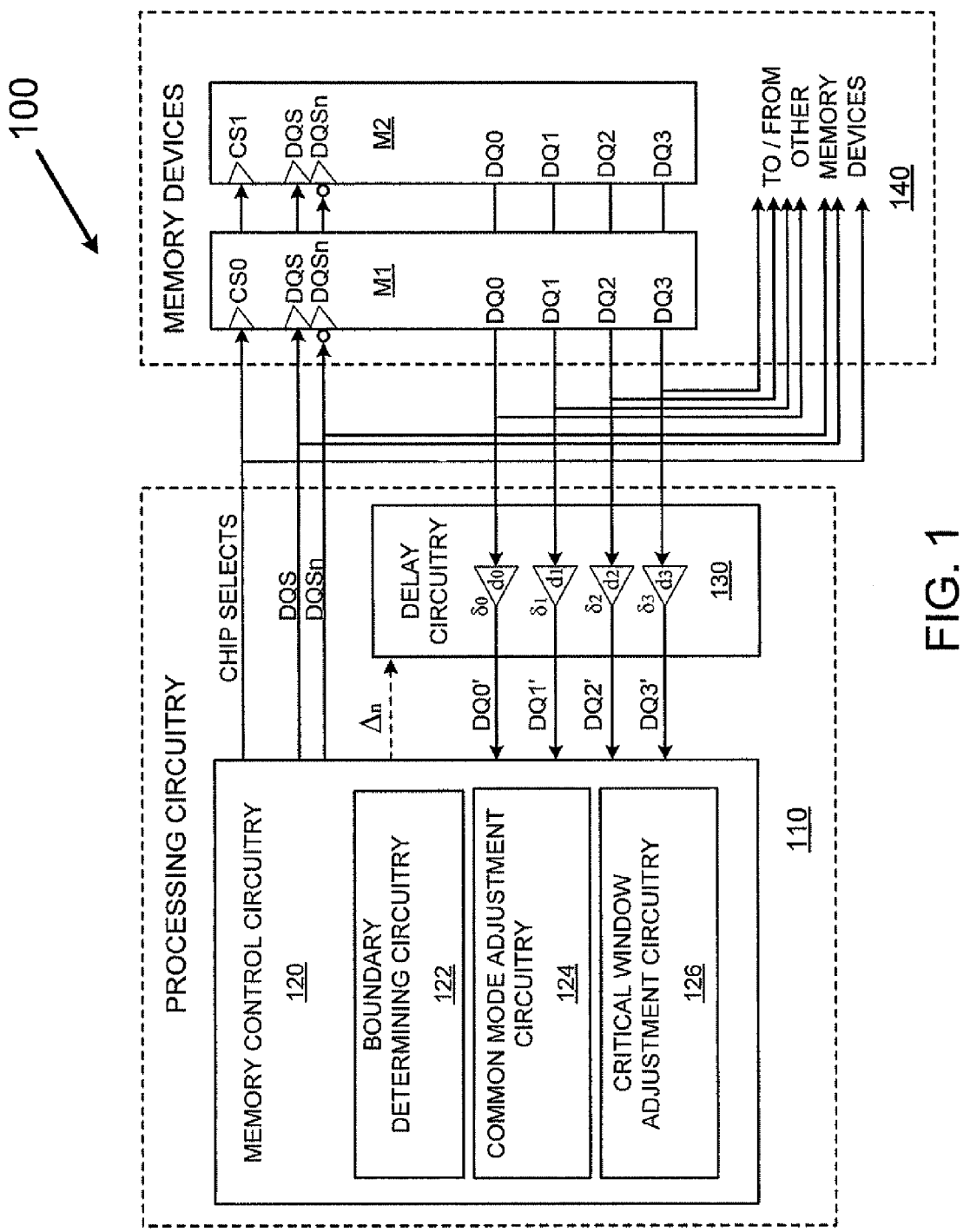
FIG. 1 is an example processing system configured to adapt and to compensate for data skew.

FIG. 1 is an example processing system 100 capable of adapting and compensating for data skew. The processing system 100 includes processing circuitry 110 and a set of memory devices 140, and in an embodiment is configured as a System on Chip (SoC).

The example processing circuitry 110 includes memory control circuitry 120 and delay circuitry 130. The memory control circuitry 120 includes boundary determining circuitry 122, common-mode adjustment circuitry 124 and critical window adjustment circuitry 126. The delay circuitry 130 includes a plurality of delay devices $\{d_0, d_1, d_2, d_3\}$ each capable of being separately adjusted so as to produce an individual delay $\{\delta_0, \delta_1, \delta_2, \delta_3\}$ for each respective data line $\{DQ0, DQ1, DQ2, DQ3\}$ to produce delayed data $\{DQ0', DQ1', DQ2', DQ3'\}$. Other devices, such as a central processing unit (CPU), Memory Management Unit (MMU), interrupt control circuitry and other devices, both known and prospective, are envisioned to be included in the processing circuitry 110, but are omitted in FIG. 1 for simplicity and clarity of explanation as they play no part in the de-skewing operations described herein. However, such devices are assumed to take advantage of the delayed data $\{DQ0', DQ1', DQ2', DQ3'\}$.

The set of memory devices 140 of FIG. 1 includes memory device M1 and memory device M2. Both memory device M1 and M2 each have four data lines, $\{DQ0, DQ1, DQ2, DQ3\}$ respectively, coupled to one another and to the processing circuitry 110. In other example embodiments, however, the number of memory devices, e.g., chips or modules, and bits per device can vary as may be necessary or desirable. While memory devices M1 and M2 are shown as devices physically coupled in series, these memory devices M1 and M2, along with any other like memory devices, can be coupled in series, parallel, or a combination thereof.

The memory control circuitry 120 has two possible modes of operation: common-mode adjustment and critical window adjustment.

In operation, the memory control circuitry 120 first performs common-mode adjustment to compensate for common-mode skew, which is defined herein as delays between data lines, e.g., DQ0 to DQ1, DQ0 to DQ2 and so on, that are shared among the different memory devices M1 and M2. For example, data line DQ0 may constantly precede data line DQ2 for both memory device M1 and memory device M2 by fifty (50) picoseconds because of a delay caused by consistent different lengths in the wiring of respective data lines, or possibly by a difference in the lengths of respective chip select lines.

In order to compensate for such common-mode skew, the memory control circuitry 120 forces the memory devices M1 and M2 to repeat various memory cycles by alternately enabling chip select CS0 and chip select CS1. In response, the data lines {DQ0, DQ1, DQ2, DQ3} are activated so as to provide data to the memory control circuitry 120 via the delay circuitry 130, which initially provides no (or minimal) differential delay.

For the purposes of this disclosure, the term "chip select" refers broadly to a change in rank among a plurality of memory devices. Such memory devices can be embodied in separate silicon chips. However, a change in chip select can refer more broadly to a change in topology where some routing path is changed. Accordingly, it is possible that multiple memory devices residing on a common silicon chip may respond to separate chip select signals.

The boundary determining circuitry 122 determines the "window" for each data line and for each chip select. For the purposes of this disclosure "window" is a time period relative to a data strobe {DQS, DQSn} transition for which data on a particular data line and for a particular chip select will be validly interpreted. Each window has a left-hand boundary (start time) and the right-hand boundary (end time). Assuming there is no transition within a particular window, data should be properly transferred from memory to processor. For the present example of four data lines and two chip selects, there are eight separate windows worth of left and right boundaries.

The common-mode adjustment circuitry 124 then receives the window information from the boundary determining circuitry 122 in order to determine whether there is common-mode skew. If there is common-mode skew between a particular pair of bits, then a control signal Δn is provided to the delay circuitry 130 so as to change an appropriate individual delay {$\delta_0, \delta_1, \delta_2, \delta_3$} by some small, incremental amount. The cycle of window determination and delay adjustment is then repeated until there is no more common-mode skew that may be addressed between any pair of data lines {DQ0, DQ1, DQ2, DQ3}.

For example, assuming that the length of the chip select line for memory device M1 is longer than the length for chip select for memory device M2, then a reasonable result (e.g., 30 ps) might be that data from memory device M1 would reach the processing circuitry 110 on average 30 ps before data from memory device M2. Assuming that the length of data lines to memory device M2 are also longer, then another 20 ps skew might result (on average) for each data bit thereby causing a total of a 50 ps common-mode skew. Assuming that the delay circuitry changes skew in increments of 25 ps, then the common-mode adjustment circuitry 124 could adjust for 50 ps of common-mode skew in two cycles thereby providing common-mode skew adjustment for all bits and between two chip selects.

While the example common-mode adjustment circuitry 124 works on an iterative basis using a plurality of memory measurement cycles, it is noted that it is possible that, in other embodiments, common-mode adjustment may be made in a single measurement cycle, and that once common-mode delay is determined the control signal Δn is provided only once to set each of the individual delays {$\delta_0, \delta_1, \delta_2, \delta_3$}.

Once common-mode adjustment is performed, the memory control circuitry 120 can perform "critical window" adjustment, which for the present disclosure is defined as a process that takes into account the windows produced by different chip selects so as to maximize data reliability.

Each data line and chip select combination can produce a window having a different duration. Further, one or both of the left-hand boundary and right-hand boundary may be displaced in time from data line to data line. For example, because of manufacturing variations, the window duration of data signals produced by memory device M1 may be fifty (50) picoseconds shorter than the window duration of data signals produced by memory device M2. Further, because the wiring paths between the processing circuitry 110 and memory device M2 is longer (in a particular embodiment) than the wiring paths between the processing circuitry 110 and memory device M1, each data line {DQ0, DQ1, DQ2, DQ3} may be skewed/delayed by an additional fifty (50) picoseconds when memory device M2 is activated by a respective chip select as compared to memory device M1.

Unlike common-mode adjustment, the example critical window adjustment process is not envisioned to be an iterative process using a plurality of memory measurement cycles, but a process using as little as a single memory measurement cycle. However, different embodiments of critical window adjustment process may be produced using an iterative process.

In operation and assuming that common-mode skew is already compensated, the memory control circuitry 120 again forces the memory devices M1 and M2 to repeat various memory cycles in order to activate the data lines {DQ0, DQ1, DQ2, DQ3} so as to provide data to the memory control circuitry 120 via the delay circuitry 130. Again, the boundary determining circuitry 122 determines the boundaries for the windows of each data line and for each chip select to provide eight separate windows worth of left and right boundaries in an embodiment.

The critical window adjustment circuitry 126 then receives this information to determine what, if any further adjustment may be provided to any of the individual delays {$\delta_0, \delta_1, \delta_2, \delta_3$}. Such an adjustment can take into account, for instance, the timing parameters for a given memory chip from a particular manufacturer. For example, for DDR3 memories, the timing parameters can be adjusted in such a way that optimizes reliability by adjusting skew relative to a differential data strobe signal DQS/DQSn. However, the purpose/function of the critical window adjustment circuitry 126 is to determine the various windows that result for the different chip select signals. The "critical window" is defined as the smallest window of a plurality of possible windows based on the different chip select signals. What the critical window adjustment circuitry 126 does is to increase the duration of the critical window to a possible maximum even at the expense of a duration of any other window being even longer in duration.

Figure 2:
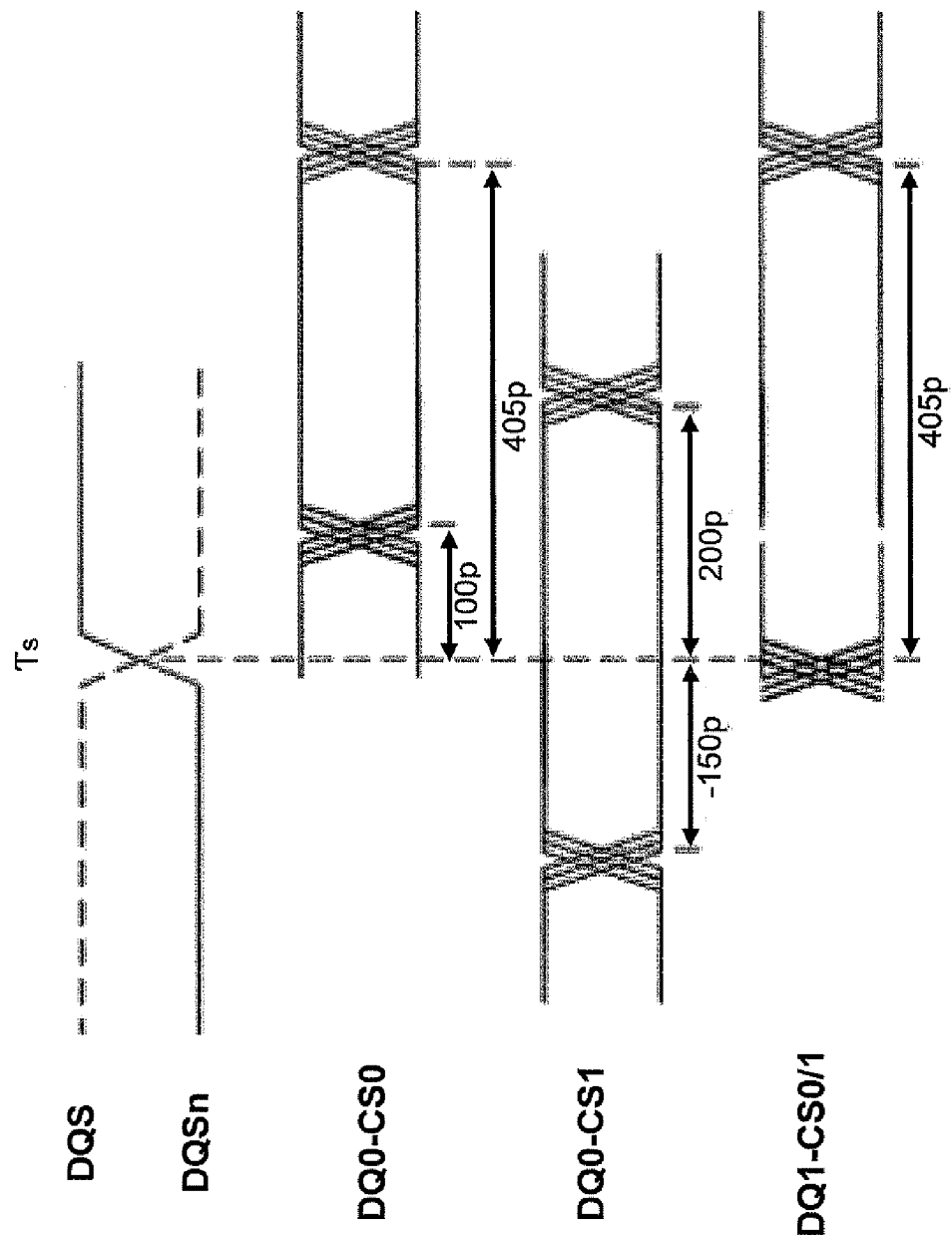
FIG. 2 depicts a first scenario for compensating for data skew using critical window adjustment.

FIG. 2 depicts a first scenario for compensating for data skew using critical window adjustment. For the example of FIG. 2, data line DQ1 is shown constant for both CS0 and CS1 and aligned with a differential data strobe signal DQS/DQSn. Accordingly, there is no need to apply common mode adjustment or critical window adjustment for data line DQ1 as common-mode skew is constant for both CS0 and CS1, and because the windows produced for both CS0 and CS1 are of the same size/duration.

However, data line DQ0 differs substantially for CS0 and CS1, and the minimum valid window for data line DQ0 is 305 ps (405 ps−100 ps) when chip select CS0 is activated as compared to 350 ps (150 ps 200 ps) when chip select CS1 is activated. It is plausible that data line DQ0 may benefit from adjusting an appropriate delay $\delta_0$ (relative to data strobe DQS/DQSn) so as to optimize data reliability. An analysis indicates that a common-mode adjustment of −25 ps may be made so as to slide DQ0 (for both CS0 and CS1) to the right relative to data strobe DQS/DQSn (time Tn) such that the change time for DQ0-CS0 follows time Tn by 125 ps and the change time for DQ0-CS1 precedes time Tn by 125 ps. As time Tn is set exactly between the two change times, common-mode adjustment may get no better. However, further analysis indicates that no critical window adjustment should be made, as no improvement on performance would result because the smallest critical window (305 ps) would not be improved/enlarged by adding or subtracting more skew.

Figure 3:
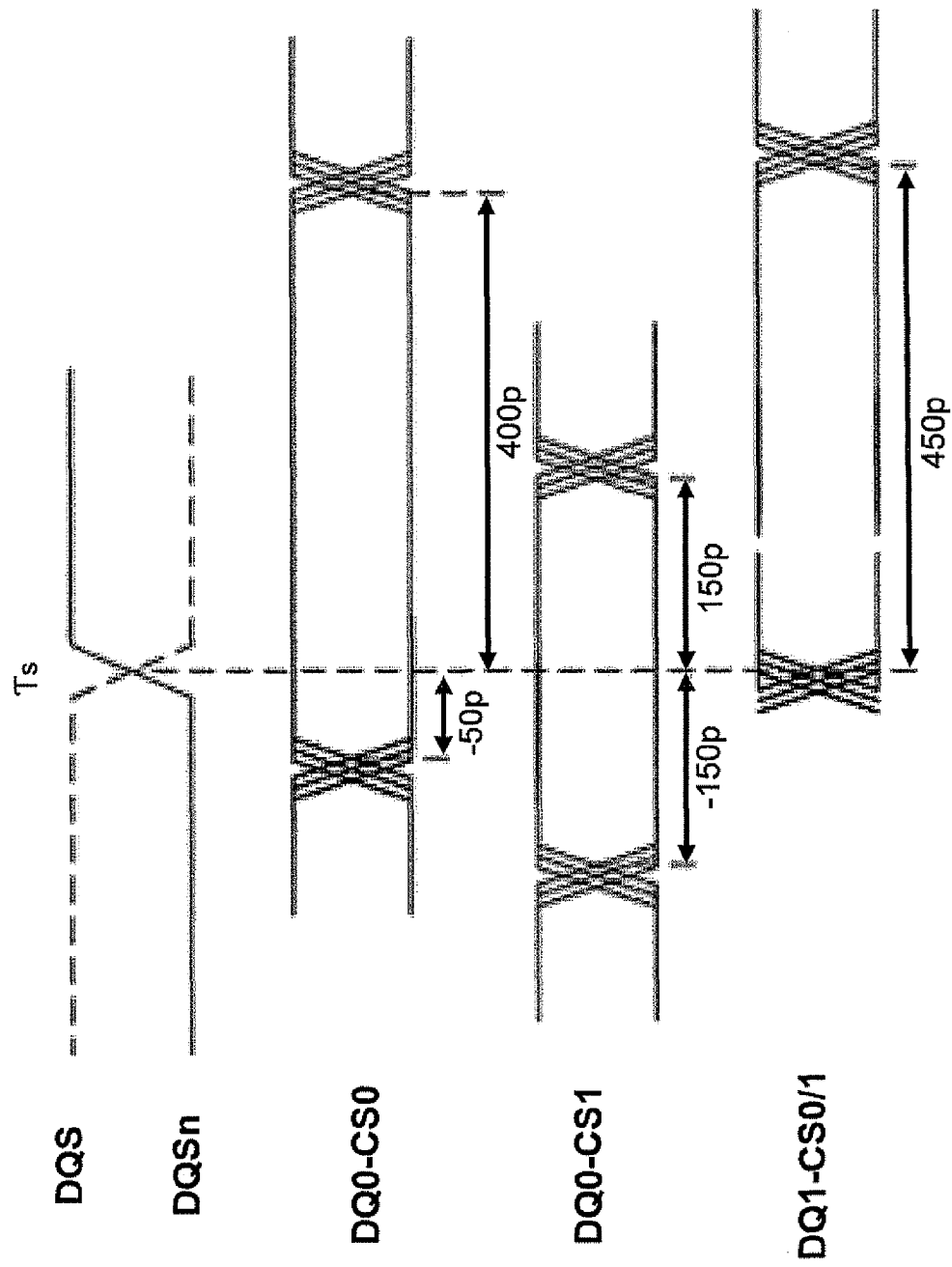
FIG. 3 depicts a second scenario for compensating for data skew using critical window adjustment.

FIG. 3 depicts a second scenario for compensating for data skew including critical window adjustment. For the example of FIG. 3, the window for data line DQ1 is again shown constant for both CS0 and CS1, and aligned with differential data strobe signal DQS/DQSn. As before, there is no need to apply common-mode or critical window adjustment for data line DQ1 because common-mode skew is constant for both CS0 and CS1, and because the windows produced for both CS0 and CS1 are of the same size/duration.

However, data line DQ0 differs substantially for CS0 and CS1. The minimum valid window for this example is 450 ps (400 ps+50 ps) when chip select CS0 is activated, as compared with 350 ps (150 ps+150 ps) when chip select CS1 is activated. Such differences may be caused by variations in physical lead lines, variations in chip manufacturing, variations caused by aging or differential temperature, or some other cause Given the window differences in DQ0 for CS0 and CS1, it is plausible that data line DQ0 may benefit from picking an appropriate delay $\delta_0$ so as to optimize data reliability. Analysis shows that an adjustment of −100 ps should be made (sliding DQ0 to the right relative to DQS/DQSn) to compensate for common-mode skew. Such an adjustment causes the change time for DQ0-CS0 to follow time Tn by 50 ps, and the change time for DQ0-CS1 precedes time Tn by 50 ps. Again, as time Tn is set exactly between the two change times (by 50 ps each), common-mode adjustment may get no better.

However, once common-mode adjustment is made, an analysis shows, that a critical window adjustment of 50 ps (sliding DQ0 to the left relative to DQS/DQSn) would be ideal in order to optimize data reliability, because it increases the duration of smaller window (i.e., the DQ0-CS1 window) to a maximum amount possible without shrinking the other window (DQ0-CS0) to a point that would decrease reliability.

Figure 4:
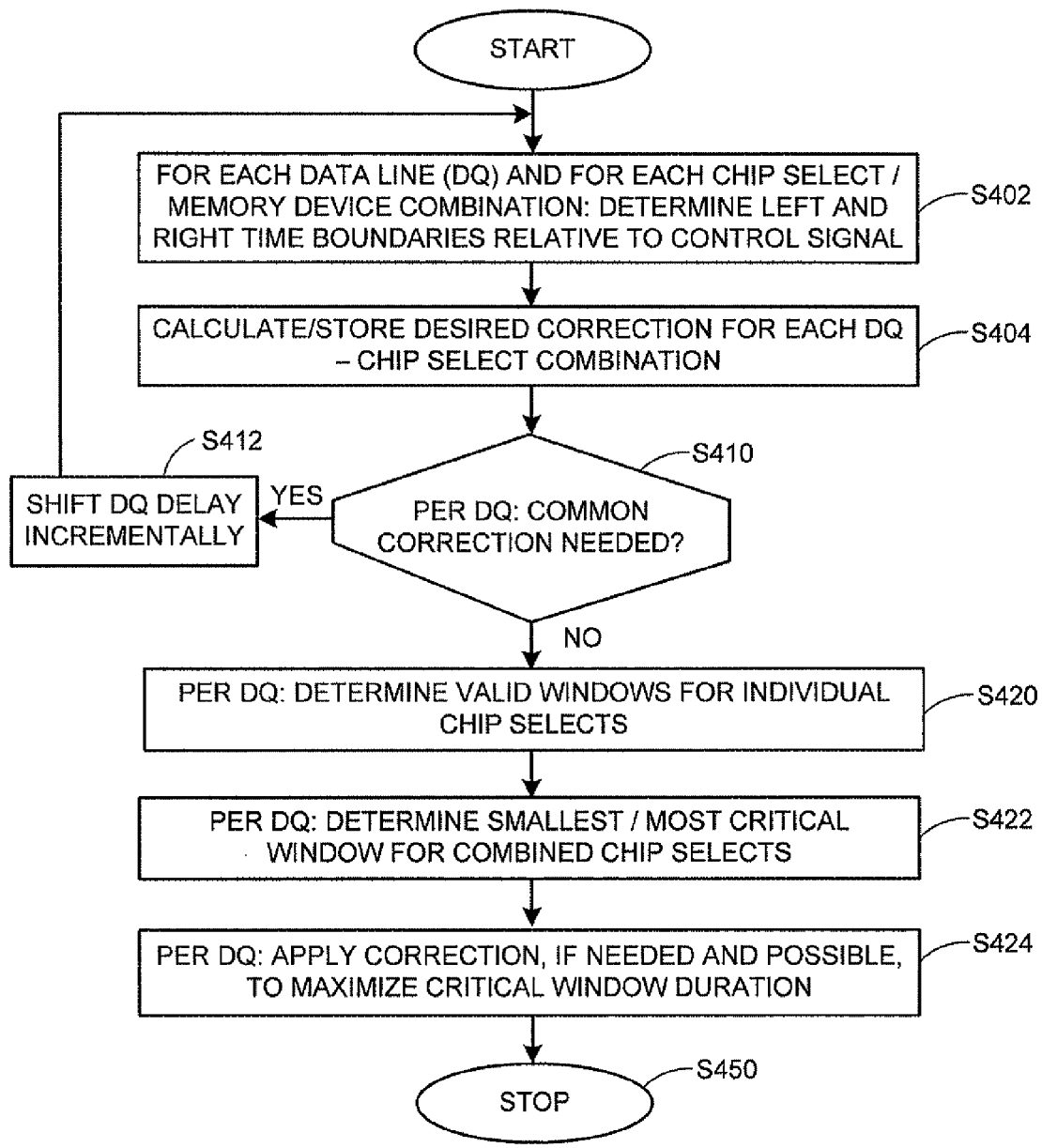
FIG. 4 is a flowchart outlining an operation of the disclosed methods and systems for compensating for data skew.

FIG. 4 is a flowchart outlining an operation of the disclosed methods and systems for compensating for data skew. While the below-described operations are described as occurring in a particular sequence for convenience, it is noted that the order of the various operations may be changed from embodiment to embodiment. It is further noted that various operations may occur simultaneously or may be made to occur in an overlapping fashion.

Steps S402-S412 are directed to common-mode adjustment; steps 420-424 are directed to critical window adjustment.

Operation starts at S402 where for each bit and each chip select (for a respective memory device), left and right timing boundaries are determined relative to a control signal, such as the differential data strobe (DQS/DQSn) depicted in FIGS. 2 and 3. Next, at S404 a desired correction can be calculated and stored for each bit/chip select combination. Then, at S410, a determination is made for each data line whether common-mode correction is needed. If a common-mode correction is needed, then control jumps to S412; otherwise, control continues to S420.

At S412, an appropriate delay is added to each appropriate data line, and control jumps back to S402 where steps S402-S412 are repeated until no additional common-mode adjustment may beneficially be added.

At S420, for each data line a valid window is determined for each chip select signal. Nest, at S422, for each data line the smallest window is determined based on various chip select signals. Then, at S424, a critical window correction process is applied if possible, i.e., with the incremental delay resolution of a delay, to increase the duration of the smallest window to a possible maximum at the expense of a duration of at least one other window for another chip select signal having a longer duration to produce an optimized critical window. Control continues to S450 where the process stops.

The de-skewing techniques described herein can be performed once upon manufacturing, or on a repeated basis. For example, in an embodiment memory control circuitry is configured to determine individual delays upon any of a software command or a hardware operation, such as a reset operation or power-up operation, and provide suitable adjustment.

The techniques and devices described herein may be implemented by various means. For example, the disclosed techniques may be implemented in hardware, software, or a combination thereof. For a hardware implementation, for example, various devices perform the aforementioned processes within one or more application specific integrated circuit (ASIC), digital signal processor (DSP), programmable logic, field programmable gate array (FPGA), processor, controller, micro-controller, microprocessor, other electronic unit designed to perform the functions described herein, or a combination thereof.

In a software implementation, the techniques described herein may be implemented with modules (e.g., procedures, functions, and so on) that perform the functions described herein. One or more forms of software code may be stored in one or more memory units and executed by one or more processors. Memory units may be implemented within a processor or external to the processor, in which such memory units can be communicatively coupled to the processor via various means, such as a network.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An apparatus embedded in a processing system configured to compensate for data skew for multiple memory devices with each memory device including a plurality of data lines of varying lengths respectively coupled to the data lines of at least one other memory device, the apparatus comprising:

delay circuitry that includes a plurality of delay devices each being individually adjustable to produce an individual delay for each data line with each data line including branches of different lengths leading to different memory devices; and memory control circuitry coupled to the delay circuitry and configured to determine, for each data line, an individual delay based on an optimized critical window, the optimized critical window being based on multiple chip select signals and further configured to adjust a delay of each individual data line based on the optimized critical window, wherein the optimized critical window is a smallest window of a plurality of possible windows based on the multiple chip select signals, the optimized critical window being increased in duration to a possible maximum at the expense of a duration of at least one other window for another chip select signal having a longer duration.

2. The apparatus of claim 1, wherein the memory control circuitry includes:

boundary determining circuitry for determining a left boundary and a right boundary for a data access timing window for an individual data line.

3. The apparatus of claim 2, wherein the memory control circuitry further includes:

common-mode adjustment circuitry for adjusting the delay of each individual data line based on common delays of multiple memory devices.

4. The apparatus of claim 3, wherein the common-mode adjustment circuitry adjusts the delay of each individual data line incrementally over a plurality of memory measurement cycles.

5. The apparatus of claim 3, wherein the memory control circuitry further includes:

critical window adjustment circuitry for adjusting the delay of each individual data line.

6. The apparatus of claim 1, wherein the memory control circuitry further includes:

critical window adjustment circuitry for adjusting the delay of each individual data line.

7. The apparatus of claim 1, wherein the memory control circuitry is configured to:

for a particular data line determine a smallest window of a plurality of possible windows based on multiple chip select signals; and increase a duration of the smallest window to a possible maximum at the expense of a duration of at least one other window for another chip select signal having a longer duration to produce the optimized critical window.

8. An apparatus configured to compensate for data skew for multiple memory devices with each memory device including a plurality of data lines respectively coupled to the data lines of at least one other memory device, comprising:

one or more integrated circuits, the one or more integrated circuits comprising:

delay circuitry that includes a plurality of delay devices each being individually adjustable to produce an individual delay for each data line with each data line including branches of different lengths leading to different memory devices; and memory control circuitry coupled to the delay circuitry and configured to determine, for each data line having branches of different lengths, an individual delay based on an optimized critical window, the optimized critical window being based on multiple chip select signals, and further configured to adjust a delay of each individual data line based on the optimized critical window, wherein the optimized critical window is a smallest window of a plurality of possible windows based on the multiple chip select signals, the optimized critical window being increased in duration to a possible maximum at the expense of a duration of at least one other window for another chip select signal having a longer duration.

9. The apparatus of claim 8, wherein the memory control circuitry includes:

boundary determining circuitry for determining a left boundary and a right boundary for a data access timing window signal for an individual data line.

10. The apparatus of claim 9, wherein the memory control circuitry further includes:

common-mode adjustment circuitry for adjusting the delay of each individual data line based on common delays of multiple memory devices.

11. The apparatus of claim 10, wherein the common-mode adjustment circuitry adjusts the delays of each individual data line incrementally over a plurality of memory measurement cycles.

12. The apparatus of claim 10, wherein the memory control circuitry further includes:

critical window adjustment circuitry for adjusting the delay of each individual data line.

13. The apparatus of claim 8, wherein the memory control circuitry is configured to:

for a particular data line, determine a smallest window of a plurality of possible windows based on multiple chip select signals; and increase a duration of the smallest window to a possible maximum at the expense of a duration of at least one other window for another chip select signal having a longer duration to produce the optimized critical window.

14. A method for compensating for data skew among multiple memory devices with each memory device including a plurality of data lines of varying lengths respectively coupled to the data lines of at least one other memory device, the method comprising:

determining, for each data line having portions of different lengths, an individual delay based on an optimized critical window, the optimized critical window being based on multiple chip select signals; and adjusting a delay for each of a plurality of delay devices to produce an individual delay for each data line based on the optimized critical window, wherein the optimized critical window is a smallest window of a plurality of possible windows based on the multiple chip select signals, the optimized critical window being increased in duration to a possible maximum at the expense of a duration of at least one other window for another chip select signal having a longer duration.

15. The method of claim 14, wherein determining an individual delay comprises:

for each data line, determining left and right boundaries for a data access timing window relative to a control signal.

16. The method of claim 14, wherein determining an individual delay further comprises:
performing common-mode adjustment by adjusting the delay of each individual data line based on common delays of multiple memory devices using different chip select signals.

17. The method of claim 15, wherein determining an individual delay further comprises:
incrementally adjusting the delay of the individual data line based on common delays of multiple memory devices over a plurality of memory measurement cycles.

18. The method of claim 14, wherein determining the critical window includes:
determining a smallest window of a plurality of possible windows based on multiple chip select signals; and
increasing a duration of the smallest window to a possible maximum at the expense of a duration of at least one other window for another chip select signal having a longer duration.

* * * * *